US006970327B2

(12) United States Patent
MacLeod

(10) Patent No.: US 6,970,327 B2
(45) Date of Patent: Nov. 29, 2005

(54) DATA STORAGE DEVICE WITH DAMPED LOAD ARM FORMED FROM MN-CU ALLOY COMPOSITION

(75) Inventor: Donald James MacLeod, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 123 days.

(21) Appl. No.: 10/607,321

(22) Filed: Jun. 26, 2003

(65) Prior Publication Data

US 2004/0066583 A1 Apr. 8, 2004

Related U.S. Application Data

(60) Provisional application No. 60/415,876, filed on Oct. 3, 2002.

(51) Int. Cl.[7] .............................. G11B 5/48; G11B 5/55; G11B 33/08; G11B 33/14

(52) U.S. Cl. ............................... 360/244.2; 360/97.02; 360/265.7; 360/265.9

(58) Field of Search .......................... 360/97.01, 97.02, 360/97.03, 98.01, 244.2, 265.7, 265.9, 266.1

(56) References Cited

U.S. PATENT DOCUMENTS

| 4,796,122 | A | * | 1/1989 | Levy et al. ............... 360/98.01 |
| 5,290,372 | A | | 3/1994 | Choi et al. |
| 5,475,549 | A | | 12/1995 | Marder et al. |
| 5,634,990 | A | | 6/1997 | Choi et al. |
| 5,672,435 | A | | 9/1997 | Born et al. |
| 5,716,467 | A | | 2/1998 | Marder et al. |
| 5,891,388 | A | | 4/1999 | Baik et al. |
| 6,134,085 | A | * | 10/2000 | Wong et al. ............... 360/244.5 |
| 6,250,364 | B1 | | 6/2001 | Chung et al. |
| 6,361,740 | B1 | | 3/2002 | Zamanzadeh et al. |
| 2002/0114108 | A1 | * | 8/2002 | Bement et al. ........... 360/245.4 |

FOREIGN PATENT DOCUMENTS

JP 01092975 A * 4/1989 ........... G11B 21/21

* cited by examiner

Primary Examiner—Craig A. Renner
(74) Attorney, Agent, or Firm—Derek J. Berger

(57) ABSTRACT

A data access assembly with a load arm formed from an Mn—Cu alloy is disclosed. The load arm may be supported by and actuator arm formed from a common Mn—Cu damping alloy, which has a composition (X)Fe—(A)Mn—(B)Cu—(C)Ni. In one embodiment, X is substantially 73, A is substantially 20, B is substantially 5 and C is substantially 2, wherein A, B, C and X represent the weight percent of the respective elements in the composition.

14 Claims, 3 Drawing Sheets

DATA STORAGE DEVICE WITH DAMPED LOAD ARM FORMED FROM MN-CU ALLOY COMPOSITION

RELATED APPLICATIONS

This application claims priority to U.S. Provisional Application No. 60/415,876 filed Oct. 3, 2002, entitled ALLOY FOR IMPROVED ARM/SUSPENSION DAMPING.

FIELD OF THE INVENTION

This invention relates generally to the field of data storage devices, and more particularly, but not by way of limitation, to an actuator assembly with improved damping.

BACKGROUND

Data storage devices are used for data storage in modern electronic products ranging from digital cameras to network systems. A data storage device includes a mechanical portion, which typically includes a storage medium and a movable data access mechanism, and electronics mounted to the mechanical portion. The printed circuit board assembly controls functions of the mechanical portion while providing a communication interface between the data storage device and its host.

The mechanical portion of the data storage device may include a data storage disc rotated at a constant speed by a spindle motor assembly and a position controllable actuator assembly, which supports a read/write head that selectively writes data to and reads data from the disc.

The data storage device market continues to place pressure on the industry for data storage devices with improved throughput performance. Reducing settle time of the head, coming on track following a seek, improves throughput performance. Minimizing actuator assembly vibration reduces settle time for improved throughput performance. As such, challenges remain and a need persists for actuator assemblies less susceptible to induced vibration.

SUMMARY OF THE INVENTION

In accordance with one embodiment, a data storage device has a load arm formed from a Mn—Cu damping alloy. The damping alloy load arm has a composition (X)Fe—(A)Mn—(B)Cu—(C)Ni. In some embodiments, X is substantially 73, A is substantially 20, B is substantially 5 and C is substantially 2, wherein A, B, C and X represent the weight percent of the respective elements in the composition. In some embodiments, the load arm may form part of an actuator assembly in which the load arm is supported by an actuator arm which may also be formed from a similar Mn—Cu damping alloy. The actuator arm may be formed as part of an actuator E-block.

Adaptation of the Mn—Cu damping alloy to the E-block and load arm of the data storage device improves performance of the data storage device by reducing the effects of vibration energy experienced by the actuator assembly, thereby promoting a more rapid settle time following a seek.

These and various other features and advantages that characterize the claimed invention will be apparent upon reading the following detailed description and upon review of the associated drawings.

DETAILED DESCRIPTION

Figure 1:
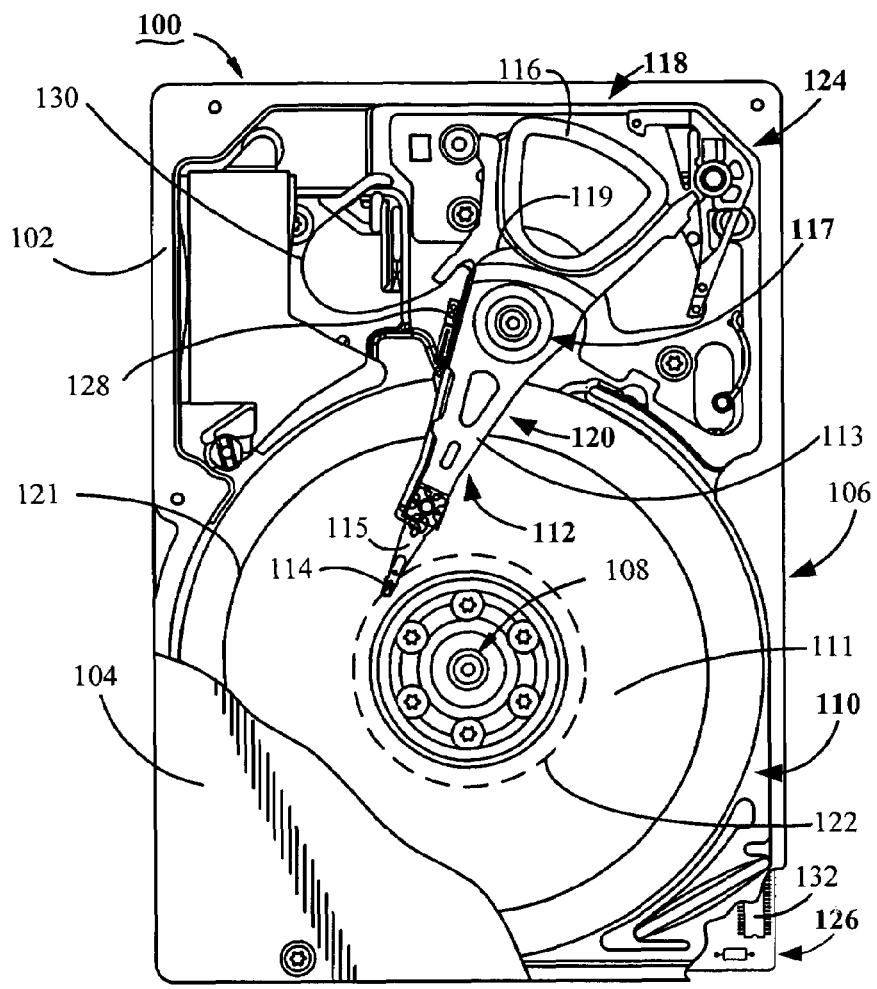
FIG. 1 is a top plan view of a data storage device that incorporates an actuator assembly less susceptible to induced vibration.

Referring now to the drawings, FIG. 1 provides a top plan view of one embodiment of a data storage device 100 in which the principles of the present invention may be applied. This data storage device 100 includes a rigid base deck 102, which cooperates with a top cover 104 (shown in partial cutaway) to form a sealed housing for a mechanical portion of the data storage device 100 (also referred to as disc drive 100). Typically, the mechanical portion of the data storage device 100 is referred to as a head-disc assembly 106. A spindle motor 108 rotates one or more of magnetic data storage discs 110 at a constant high speed, each disc 110 having at least one recording surface 111. A rotary actuator assembly 112 (also referred to herein as actuator 112) supports one or more read/write heads 114 (also referred to herein as heads 114) adjacent the disc(s) 110. The actuator 112 is rotated through application of current to a voice coil 116 of a voice coil motor (VCM) 118. The voice coil includes a lead 120 for receiving current to power the coil.

During data transfer operations with a host device (not shown), the actuator 112 moves the heads 114 to data tracks 121, one shown (also referred to as an information track 121) on the surfaces of the discs 110 to write data to and read data from the discs 110. When the data storage device 100 is deactivated, the actuator 112 removes the heads 114 from the data tracks 121 to a home position 122 of the disc 110; the actuator 112 is then confined by latching a toggle latch 124.

Command and control electronics, as well as other interface and control circuitry for the data storage device 100, may be provided on a printed circuit board assembly 126 mounted to the underside of the base deck 102. A primary component for use in conditioning read/write signals passed between the command and control electronics of printed circuit board assembly 126 and the read/write head 114 is a preamplifier/driver (preamp) 128, which prepares a read signal acquired from the information track 121 by the read/write head 114 for processing by read/write channel circuitry (not separately shown) of the printed circuit board assembly 126. The preamp 128 is attached to a flex circuit 130 with conductors (not separately shown) conducting signals between the read/write head 114 and the preamp 128, and between the preamp 128 and the printed circuit board assembly 126 during data transfer operations.

Position-controlling of the read/write heads 114 is provided in this embodiment by the voice coil motor 118 operating under the control of a servo control circuit 132

(FIG. 2) programmed with servo control code, which collectively forms a servo control loop.

Figure 2:
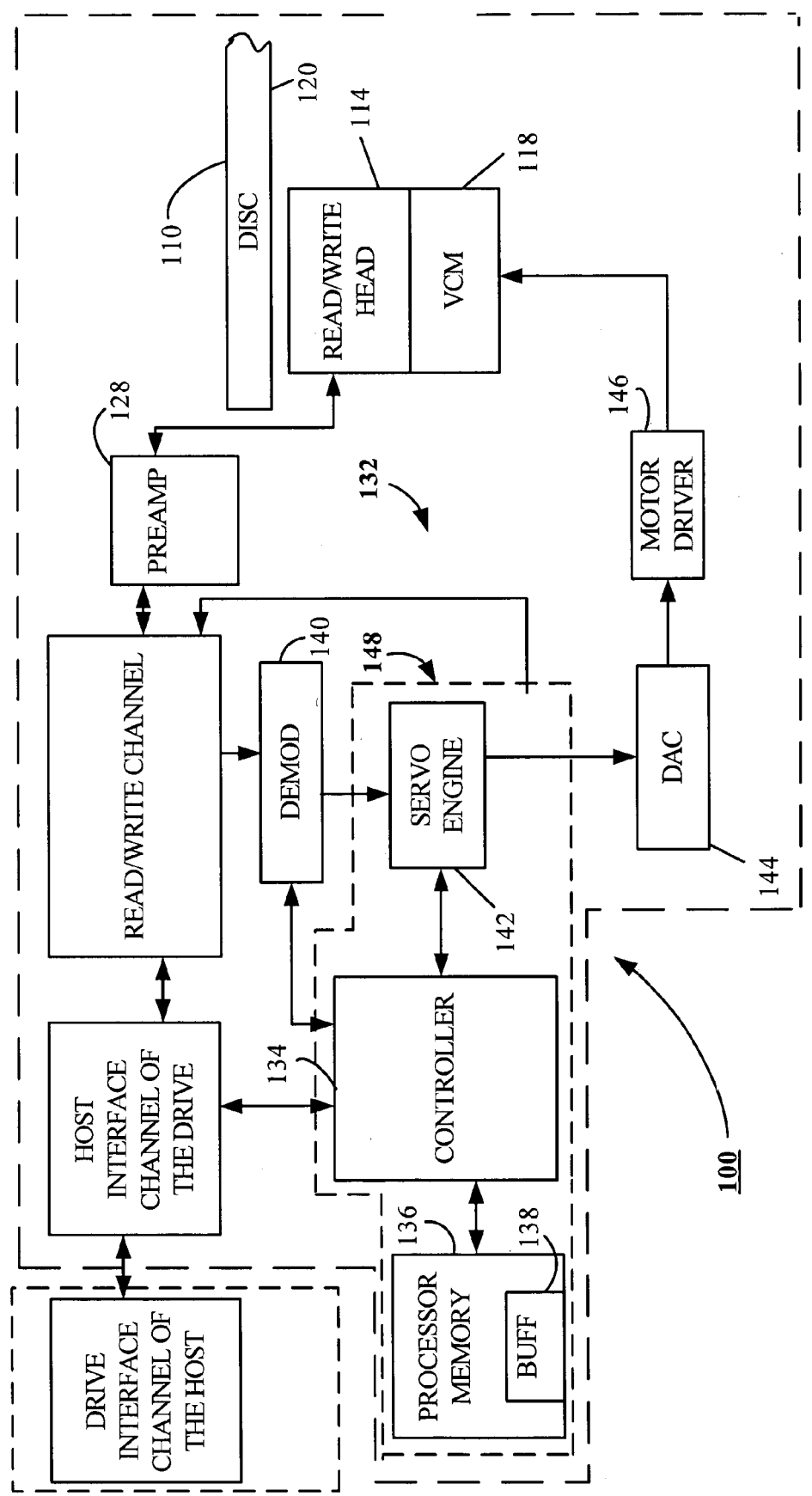
FIG. 2 is a functional block diagram of a circuit for controlling operation of the data storage device of FIG. 1.

Turning to FIG. 2, one contemplated embodiment of a servo control circuit 132 includes a micro-processor controller 134 (also referred to herein as controller 134), a memory 136, a buffer memory 138, a demodulator (DE-MOD) 140, an application specific integrated circuit (ASIC) hardware-based servo controller ("servo engine") 142, a digital to analog converter (DAC) 144 and a motor driver circuit 146. Optionally, the controller 134, the memory 136, and the servo engine 142 are portions of an application specific integrated circuit 148. The buffer memory 138 of the memory 136 is used for storage of information collected or calculated during operation of the data storage device 100.

The components of the servo control circuit 132 are utilized to facilitate track following algorithms for the actuator 112 (of FIG. 1) and more specifically for controlling the voice coil motor 118 in position-controlling the read/write head 114 relative to the selected information track 121 (of FIG. 1).

The demodulator 140 conditions head position control information transduced from the information track 121 of the disc 110 to provide position information of the read/write head 114 relative to the disc 110. The servo engine 142 generates servo control loop values used by the controller 134 in generating command signals such as seek signals used by the voice coil motor 118 in executing seek commands. Control loop values are also used to maintain a predetermined position of the actuator 112 during data transfer operations.

The command signals generated by the controller 134 and passed by the servo engine 142 are converted by the digital to analog converter 144 to analog control signals. The analog control signals are used by the motor driver circuit 146 in position-controlling the read/write head 114 relative to the selected information track 121, during track following, and relative to the surface of the disc 110 during seek functions.

It should, of course, be understood that the present invention may be applicable in data storage devices other than those described above and in the attached drawings, and using a servo control system other that that described above and illustrated, without departing from the spirit of the present invention.

Returning to FIG. 1, during seek operations, as well as track following operations, stability of the read/write head 114 is an important consideration for either an effective read of data from or write of data to the information tracks 121. By having both the actuator arm 113 and a load arm 115 of the actuator assembly 112 as well as the base deck 102 and the cover 104 formed from the same material, a common coefficient of thermal expansion and frequency response is shared by the members of the actuator 112 most influencing head stability.

Control of noise and vibration of material is taken into account when designing the data storage device 100. Therefore, the development of damping materials suitable for structural parts that are easy to process and recycle is beneficial for use in the manufacture and operation of components of the head-disc assembly 106 of the data storage device 100. From among developed damping alloys, Mn—Cu damping alloys show satisfactory mechanical properties and damping capacity to improve performance of the data storage device 100 by reducing the effects of vibration energy experienced by the head-disc assembly 106, thereby promoting a more rapid settle time following a seek.

The Mn—Cu damping alloy, which has a nominal composition of Mn-20; Cu-5; Ni-2; and Fe—balance (% weight), shows both a high damping capacity and a high strength suitable for use in producing the actuator arm 113, the load arm 115, as well as the base deck 102, and the top cover 104. The damping capacity of the Mn—Cu damping alloy increases to a high level below a certain temperature and the damping level also varies sensitively to the changes in vibration frequency and strain amplitude. By the peak-shift method the thermal activation energy for the twin boundaries responsible for the low-temperature damping peak is calculated to be $4.88 \times 10^4$ J/mol. The tensile strength of the Mn—Cu damping alloy is 500 MPa.

Figure 3:
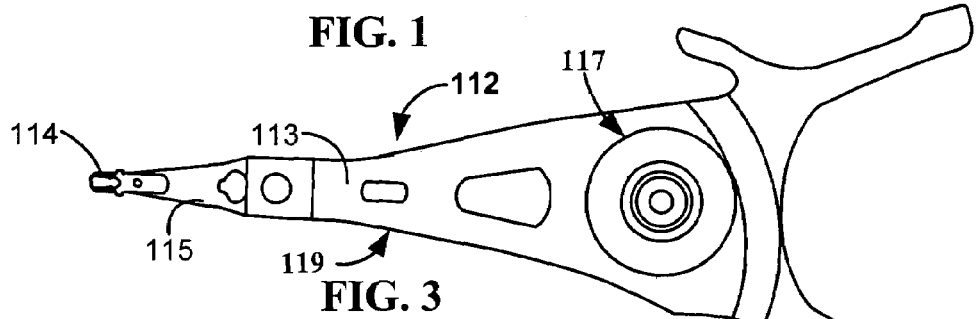
FIG. 3 is a top plan view of a mechanical portion of an actuator assembly of the data storage device of FIG. 1.

FIG. 3 shows a bearing assembly 117 secured to an E-block 119 of the actuator 112. In a preferred embodiment, the actuator arm 113 is a portion of the E-block 119 that supports the load arm 115. In a preferred embodiment both the E-block 119 and the load arm 115 are formed from a common Mn—Cu damping alloy.

It is noted however, an election of the E-block 119 configuration as an illustrative example of a presentation of the actuator arm 113 that incorporates a Mn—Cu damping alloy, for use in the data storage device 100 of FIG. 1, does not serve as a limitation of the present invention. Alternative configurations of actuator arms incorporating the Mn—Cu damping alloy may be selected for use in the actuator 112 of the data storage device lie within the scope of the present invention.

Figure 4:
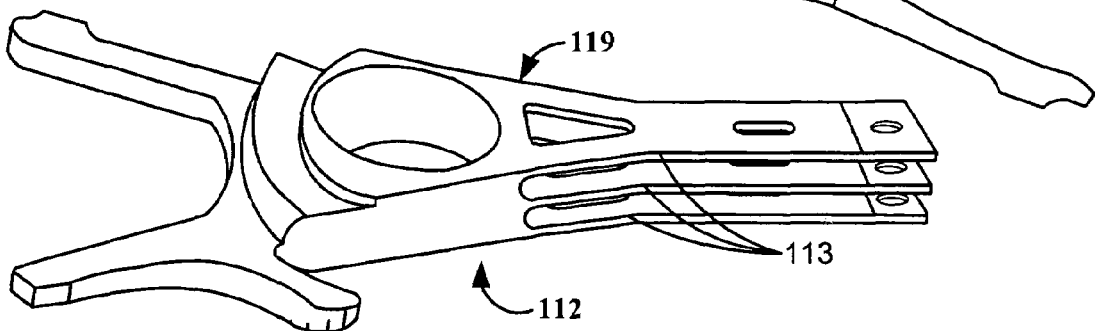
FIG. 4 is a perspective view of the mechanical portion of the actuator assembly of the data storage device of FIG. 1.

FIG. 4 shows the E-block supporting a plurality of actuator arms 113 formed from the Mn—Cu damping alloy of the present invention. The number of actuator arms 113 incorporated in the actuator 112 of the data storage device fails to serve as a limitation of the present invention. Actuator arms presented in an E-block configuration is a convenient form for presentation of the present invention.

Figure 5:
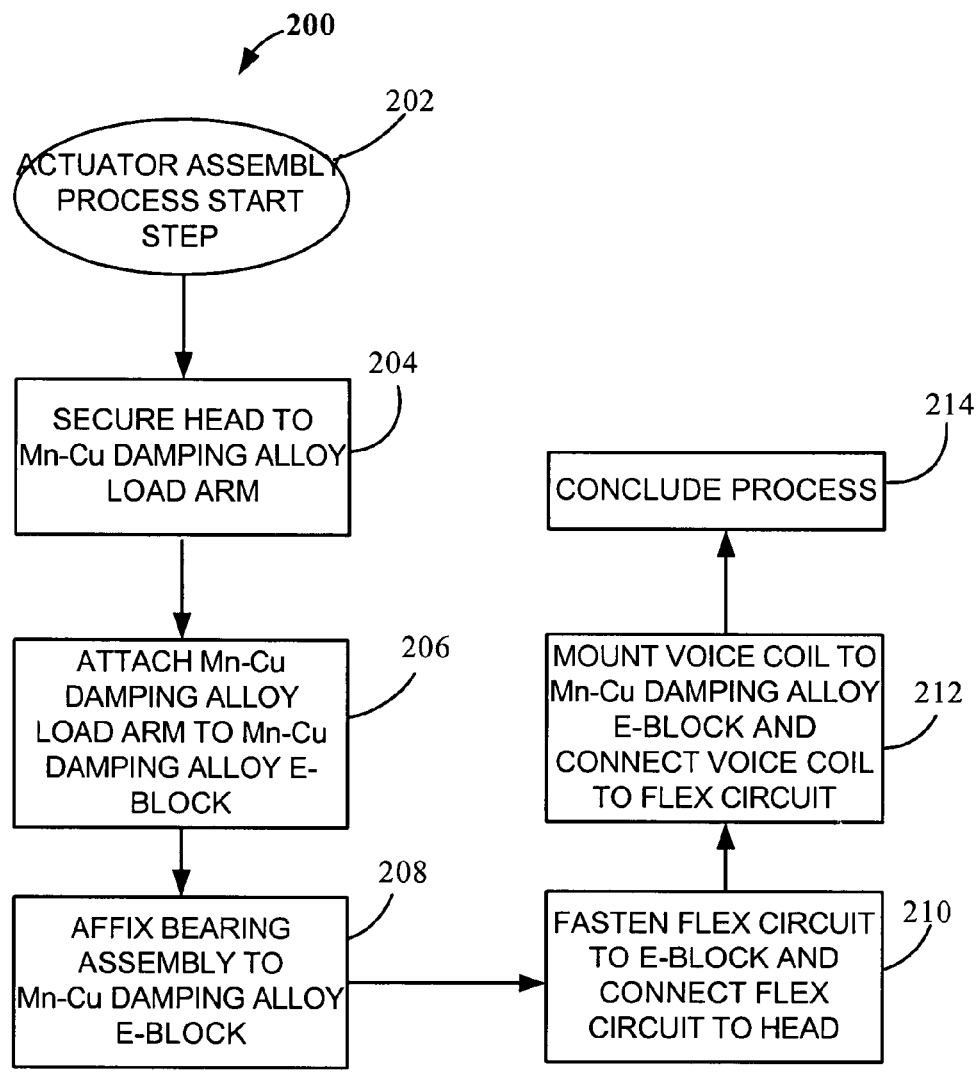
FIG. 5 is a process flow chart of a method of assembling the actuator assembly of the data storage device of FIG. 1.

FIG. 5 shows a process flow chart 200 for a method of assembling an actuator assembly (such as 112). The process commences with start step 202. At process step 204, a read/write head (such as 114) is secured to a Mn—Cu damping alloy load arm (such as 115). At process step 206, the Mn—Cu damping alloy load arm, with the read/write head secured thereon, is attached to a Mn—Cu damping alloy actuator arm (such as 113) of an Mn—Cu damping alloy E-block (such as 119), and a bearing assembly (such as 117) is affixed to the Mn—Cu damping alloy E-block at process step 208.

At process step 210, a flex circuit assembly (such as 130) with an attached preamp (such as 128) is fastened to the Mn—Cu damping alloy E-block and connected to the read/write head. At process step 212, a voice coil (such as 116) mounted to the Mn—Cu damping alloy E-block and interconnected with the flex circuit, which concludes the process at process step 214.

Figure 6:
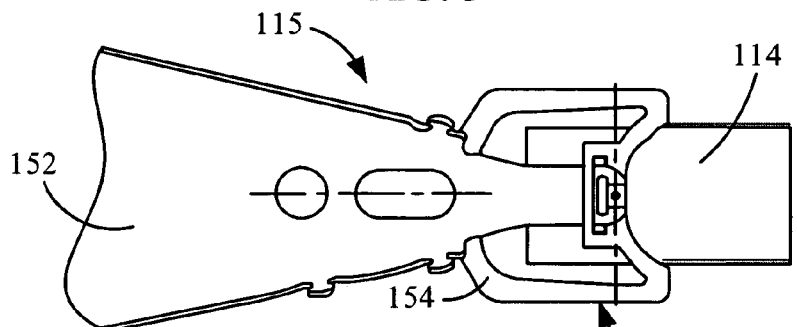
FIG. 6 is a partial cutaway plan view of a load arm of the actuator assembly of FIG. 3.

FIG. 6 shows a suspension portion 150 of the load arm 115 attached to a load beam portion 152 of the load arm 115. The suspension portion 150 communicates with the read/write head 114 (FIG. 1) to secure the read/write head 114 to the load arm 115, while the load beam portion 152 communicates with the actuator arm 113 (FIG. 1) to secure the load arm 115 to the E-block 119 (FIG. 1).

The suspension portion 150 and the load beam portion 152 are each formed from the Mn—Cu damping alloy having the compassion of Mn-20; Cu-S; Ni-2; and Fe—balance (% weight).

Figure 7:
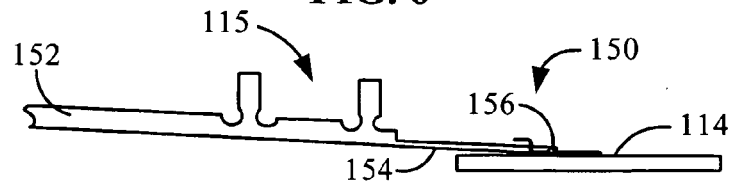
FIG. 7 is a partial cutaway elevational view of the load arm of the actuator assembly of FIG. 6.

FIG. 7 shows the suspension portion 150 of the load arm 115, which includes a gimbal spring 154 coupled to the load beam 152. The gimbal spring 154 flexibly supports the read/write head 114 relative to the load beam 152. A load button 156 of the load beam 152 applies a load force to the upper surface of the read/write head 114 and defines a gimbal pivot axis about which the read/write head 114 can pitch, and a pivot axis about which the read/write head can roll, relative to the recording surface 111 of the disc 110 of FIG. 1.

Accordingly, embodiments of the present invention are generally directed to an actuator assembly (such as 112) of a data storage device (such as 100), wherein a load arm (such as 115) of the actuator assembly is a Mn—Cu damping alloy load arm, and wherein the Mn—Cu damping alloy load arm is supported by a Mn—Cu damping alloy actuator arm (such as 113).

In a preferred embodiment, the Mn—Cu damping alloy actuator arm is a portion of an E-block (such as 119) in which the E-block is formed from a Mn—Cu damping alloy.

For purposes of the appended claims, it will be understood that the disclosed method corresponding to the recited steps for element includes the steps shown by the flow chart shown in FIG. 5.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the appended claims.

What is claimed is:

1. A data storage device comprising:
a storage medium; and
an access device for accessing the storage medium, the access device further comprising:
a load arm formed from an alloy having a composition (X)Fe—(A)Mn—(B)Cu—(C)Ni, wherein A, B, C and X represent the non-zero weight percent of the respective elements in the composition.

2. The data storage device of claim 1 in which A is substantially 20, B is substantially 5, C is substantially 2, and X is substantially 73.

3. The data storage device of claim 1, in which the load arm forms part of an actuator assembly, the actuator assembly further comprising:
an actuator arm having a composition substantially identical to that of the load arm, the load arm being supported by the actuator arm.

4. The data storage device of claim 3, in which the actuator assembly further comprises:
an E-block, the actuator arm forming part of the E-block.

5. The data storage device of claim 1, in which the storage medium comprises:
a rotatable disc.

6. A data storage device comprising:
a base deck supporting a rotatable disc; and
an actuator assembly adjacent the rotatable disc while secured to the base deck, the actuator assembly comprising:
an E-block communicating with the base deck;
a load arm attached to the E-block, the load arm being formed entirely from a Mn—Cu alloy and supporting a read/write head interacting with the rotatable disc;
a bearing assembly affixed to the E-block facilitating rotationally positioning of the read/write head relative to the rotatable disc;
a flex circuit fastened to the E-block while connected to the read/write head, the flex circuit comprising a preamplifier and a conductor, the conductor passing a signal between the read/write head and the preamplifier; and
a voice coil mounted to the E-block while connected to the flex circuit, the voice coil positioning the read/write head to interact with the rotatable disc.

7. The data storage device of claim 6, in which the Mn—Cu alloy has a composition of (X)Fe—(A)Mn—(B)Cu—(C)Ni, wherein A, B, C and X represent the weight percent of the respective elements in the composition.

8. The data storage device of claim 7, in which A is substantially 20, B is substantially 5, C is substantially 2, and X is substantially 73.

9. The data storage device of claim 6, in which the E-block comprises an actuator arm formed from a Mn—Cu alloy.

10. The data storage device of claim 9, in which the Mn—Cu alloy from which the actuator arm is formed has a composition (X)Fe—(A)Mn—(B)Cu—(C)Ni, and in which A is substantially 20, B is substantially 5, C is substantially 2, and X is substantially 73, and further wherein A, B, C and X represent the weight percent of the respective elements in the composition.

11. The data storage device of claim 6, in which the E-block is formed from a Mn—Cu damping alloy and the E-block further comprises an actuator arm portion formed as a single, continuous piece of material therewith.

12. The data storage device of claim 11, in which the Mn—Cu alloy from which the actuator E-block is formed comprises an alloy having a composition (X)Fe—(A)Mn—(B)Cu—(C)Ni, and in which A is substantially 20, B is substantially 5, C is substantially 2, and X is substantially 73, wherein A, B, C and X represent the weight percent of the respective elements in the composition.

13. The data storage device of claim 6 further comprising: a top cover having a composition (X)Fe—(A)Mn—(B)Cu—(C)Ni, and in which the base deck has a composition (X)Fe—(A)Mn—(B)Cu—(C)Ni, and wherein A is substantially 20, B is substantially 5, C is substantially 2, and X is substantially 73, wherein A, B, C and X represent the weight percent of the respective elements in the composition.

14. The data storage device of claim 6, in which the load arm comprises a load beam and a suspension supporting the read/write head, in which the load beam and the suspension are both formed from the Mn—Cu alloy.

* * * * *